(12) United States Patent
Otsubo et al.

(10) Patent No.: US 8,209,108 B2
(45) Date of Patent: Jun. 26, 2012

(54) FUEL INJECTION DEVICE AND CONTROL METHOD THEREFOR

(75) Inventors: Yasuhiko Otsubo, Toyota (JP); Masanobu Katayama, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 651 days.

(21) Appl. No.: 12/312,064

(22) PCT Filed: Nov. 22, 2007

(86) PCT No.: PCT/IB2007/003589
§ 371 (c)(1),
(2), (4) Date: Apr. 24, 2009

(87) PCT Pub. No.: WO2008/062292
PCT Pub. Date: May 29, 2008

(65) Prior Publication Data
US 2010/0042307 A1 Feb. 18, 2010

(30) Foreign Application Priority Data
Nov. 24, 2006 (JP) ................. 2006-317377

(51) Int. Cl.
*G06F 19/00* (2011.01)
*F01N 3/20* (2006.01)
*F02B 3/00* (2006.01)
*F02B 75/10* (2006.01)

(52) U.S. Cl. ......... 701/104; 123/27 R; 123/299; 60/285; 60/295

(58) Field of Classification Search ................ 123/27 R, 123/299, 300, 478, 480, 492, 493; 701/101–105, 701/110, 115; 60/274, 285, 295, 297
See application file for complete search history.

(56) References Cited

U.S. PATENT DOCUMENTS

| | | | | |
|---|---|---|---|---|
| 4,487,190 A | * | 12/1984 | Isobe | 123/492 |
| 4,508,075 A | * | 4/1985 | Takao et al. | 123/480 |
| 4,524,745 A | * | 6/1985 | Tominari et al. | 123/478 |
| 6,904,893 B2 | * | 6/2005 | Hotta et al. | 123/299 |
| 6,978,602 B2 | * | 12/2005 | Ohtake et al. | 60/285 |
| 2002/0073696 A1 | | 6/2002 | Kuenstler et al. | |
| 2003/0051466 A1 | | 3/2003 | Baeuerle et al. | |
| 2006/0086083 A1 | | 4/2006 | Yacoub | |
| 2006/0107921 A1 | | 5/2006 | Grunaug et al. | |

FOREIGN PATENT DOCUMENTS

| | | |
|---|---|---|
| DE | 101 40 120 A1 | 3/2003 |
| EP | 1 076 166 A2 | 2/2001 |

(Continued)

*Primary Examiner* — Willis Wolfe, Jr.
(74) *Attorney, Agent, or Firm* — Oliff & Berridge, PLC

(57) ABSTRACT

This device is applied to an internal combustion engine that has a fuel injection valve for injecting fuel directly into the combustion chamber, a supercharger and an exhaust purification device. As a fuel injection from the fuel injection valve, a post-injection is executed separately from the fuel injection for torque generation. The device includes an air amount sensor provided on the intake passageway upstream of the supercharger, and a pressure sensor provided on the intake passageway downstream of the supercharger. A correction term is calculated based on the rate of change of the air pressure detected by the pressure sensor. An upper-limit injection amount is set based on the engine rotation speed, the passageway air amount detected by the air amount sensor, the correction term and a main injection amount. Using the upper-limit injection amount, a target post-injection amount is restricted.

8 Claims, 4 Drawing Sheets

FOREIGN PATENT DOCUMENTS

| | | |
|---|---|---|
| EP | 1 205 647 A1 | 5/2002 |
| EP | 1 650 419 A1 | 4/2006 |
| FR | 2 840 649 A1 | 12/2003 |
| FR | 2 879 254 A1 | 6/2006 |
| JP | A-02-218921 | 8/1990 |
| JP | A-04-191452 | 7/1992 |
| JP | A-2003-322015 | 11/2003 |
| JP | A-2005-076504 | 3/2005 |
| JP | A-2006-299833 | 11/2006 |
| WO | WO 2004/076840 A1 | 9/2004 |

\* cited by examiner

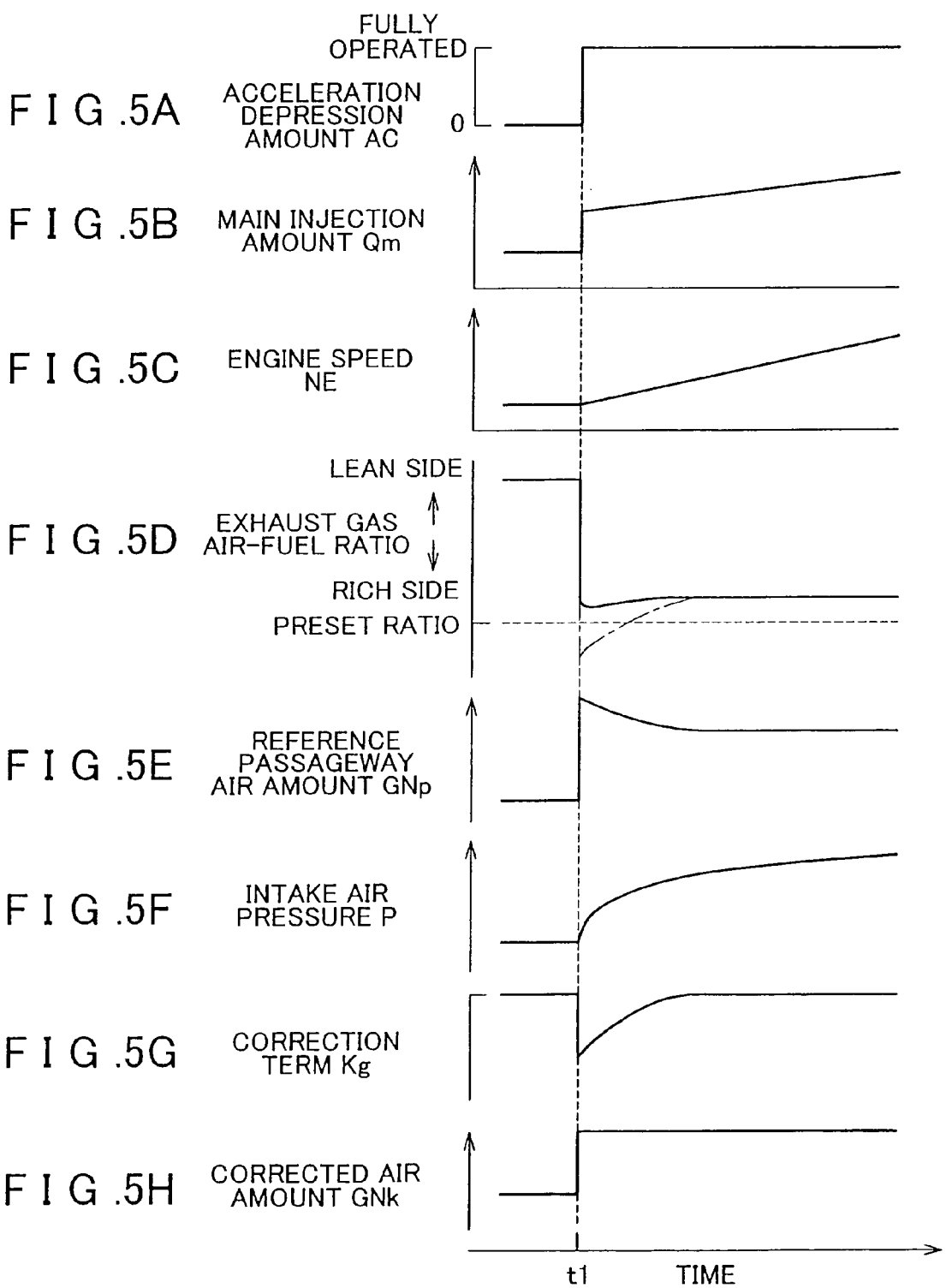

FUEL INJECTION DEVICE AND CONTROL METHOD THEREFOR

BACKGROUND OF THE INVENTION

1. Field of the Invention

The invention relates to a fuel injection device that is applied to an internal combustion engine equipped with a supercharger to execute post-injection from a fuel injection valve during the expansion stroke or the exhaust stroke separately from the fuel injection executed for torque generation, and to a control method for the fuel injection device.

2. Description of the Related Art

Internal combustion engines equipped with superchargers for forcing air into the combustion chambers are disclosed (see Japanese Patent Application Publication No. 4-191452 (JP-A-4-191452) and Japanese Patent Application Publication No. 2-218921 (JP-A-2-218921)). In a type of internal combustion engine that directly injects fuel into its combustion chamber, an amount of fuel appropriate to the state of operation of the engine is supplied by controlling the opening and closing of the fuel injection valve in accordance with the state of operation.

Furthermore, in internal combustion engines, an exhaust purification device that includes a catalytic converter, an exhaust filter, etc., for purifying exhaust gas is provided on an exhaust passageway. In order to obtain full performance of the function of the exhaust purification device, post-injection is executed. This post-injection is a fuel injection from a fuel injection valve that is executed during the expansion stroke or the exhaust stroke, and is executed separately from the fuel injection executed for torque generation.

Still further, internal combustion engines are equipped with a sensor for detecting the amount of air flowing in an intake passageway (e.g., an intake air amount sensor, a pressure sensor, etc.). On the basis of the air amount (passageway air amount) detected by the sensor, various controls concerning the operation of the internal combustion engine (e.g., the fuel injection valve opening-closing control, or the like) are executed.

In the supercharger-equipped internal combustion engine, the passageway air amount rapidly increases at the time of sharp acceleration. At this time, a part of the increase in the passageway air amount is consumed by the rise in the intake pressure. Therefore, during a period until the air pressure in the intake passageway (intake air pressure) rises to a pressure appropriate to the engine operation state, the degree of increase in the amount of air actually taken into the combustion chamber (in-cylinder air amount) is smaller than the degree of increase in the aforementioned passageway air amount, and therefore a deviation occurs between the passageway air amount and the in-cylinder air amount.

If the engine control is executed without taking this deviation into account, the engine control is executed in a fashion that accords not with the in-cylinder air amount, which is comparatively slow in increase, but with the passageway air amount, which is greater in the degree of increase than the in-cylinder air amount. Therefore, for example, if an amount of air in accordance with the passageway air amount is injected from the fuel injection valve, an unnecessarily large amount of fuel is supplied into the internal combustion engine, and the air-fuel ratio (=air amount/fuel amount) in the combustion chamber becomes an unnecessarily fuel-rich ratio.

Furthermore, if the post-injection is executed during sharp acceleration, excessive increase in the amount of unburned fuel components in exhaust gas will likely result since the sharp acceleration itself is an operation state in which the air-fuel ratio in the combustion chamber tends to be a fuel-rich side air-fuel ratio, and fuel is added by the post-injection.

If the amount of unburned fuel components in exhaust gas actually becomes excessively large, a part of the amount of unburned fuel components in exhaust gas passes unreacted through the exhaust purification device, and is emitted out of the exhaust passage, and thus the property of emissions deteriorates; for example, white smoke is produced, or the like.

SUMMARY OF THE INVENTION

It is an object of the invention to provide a fuel injection device and a control method for the device capable of restraining the deterioration of the property of emissions caused by the execution of the post-injection.

A first aspect of the invention is a fuel injection device which is applied to an internal combustion engine having a fuel injection valve that injects fuel directly into a combustion chamber, a supercharger that forces air into the combustion chamber, and an exhaust purification device provided on an exhaust passageway and which executes, as a fuel injection from the fuel injection valve, a post-injection that is a fuel injection during an expansion stroke or an exhaust stroke, separately from the fuel injection for torque generation, the fuel injection device including: a rotation speed sensor for detecting a rotation speed of an engine output shaft; an air amount sensor that is provided on an intake passageway upstream of the supercharger in an air flow direction, and that detects an air amount that flows in the intake passageway; a pressure sensor that is provided on the intake passageway downstream of the supercharger in the air flow direction, and that detects an air pressure inside the intake passageway; correction term calculation means for calculating a correction term based on a rate of change of the air pressure detected by the pressure sensor; setting means for setting an upper-limit injection amount based on the rotation speed of the engine output shaft, the air amount, the correction term, and a fuel injection amount in the fuel injection for torque generation; and restriction means for restricting the fuel injection amount in the post-injection with the upper-limit injection amount.

In the foregoing construction, a value (correction term) that corresponds to the amount of air that is a part of the amount of air that flows in the intake passageway (the passageway air amount) at the time of sharp acceleration of the internal combustion engine and which is consumed to raise the intake air pressure can be calculated on the basis of the rate of change of the air pressure inside the intake passageway (the intake air pressure). Furthermore, it becomes possible to specifically determine the amount of air actually taken into the combustion chamber (the in-cylinder air amount) on the basis of the aforementioned correction term, the passageway air amount, and the rotation speed of the engine output shaft. Therefore, according to the foregoing construction, it is possible to accurately set the upper-limit injection amount at the time of post-injection which allows the exhaust gas air-fuel ratio to be kept at a ratio above a predetermined ratio in a manner that accords with the aforementioned in-cylinder air amount and the fuel injection amount injected by the fuel injection for torque generation, and it is possible to restrain the deterioration of the property of emissions caused by the execution of the post-injection.

In the first aspect of the invention, the fuel injection device may further include: air amount calculation means for calculating the air amount that flows in the intake passageway per unit rotation of the engine output shaft based on the air amount and the rotation speed of the engine output shaft; and correction means for subjecting the air amount calculated by the air amount calculation means to a reducing correction with the correction term, and the setting means may set the upper-limit injection amount based on the air amount corrected by the correction means and the fuel injection amount in the fuel injection for torque generation.

According to this construction, a value corresponding to the in-cylinder air amount per rotation of the engine output shaft (the reference in-cylinder air amount) (i.e., the air amount that has been subjected to the reducing correction by the correction means) can be calculated on the basis of the air amount that passes through the intake passageway per rotation of the engine output shaft (the reference passageway air amount) and the correction term. Furthermore, the upper-limit injection amount regarding the post-injection which allows the exhaust gas air-fuel ratio to be kept at a ratio above the predetermined ratio can be accurately set in a manner that accords with the value that corresponds to the reference in-cylinder air amount and with the fuel injection amount in the fuel injection for torque generation.

Furthermore, the correction means may calculate as the correction term a value that more greatly reduces the air amount calculated by the calculation means, if the rate of change of the air pressure detected by the pressure sensor is higher.

It is to be noted that the higher the rate of change of the intake air pressure, the more rapidly the passageway air amount and the in-cylinder air amount change, and the larger the difference between the reference passageway air amount and the reference in-cylinder air amount. According to the foregoing construction, the reference passageway air amount is subjected to the reducing correction in accordance with the tendency of occurrence of the difference between the reference passageway air amount and the reference in-cylinder air amount, for example, in a manner in which the larger the difference therebetween, the larger reducing correction the reference passageway air amount is subjected to. The thus calculated air amount can be provided as a value that corresponds to the reference in-cylinder air amount.

Further, using an engine rotation speed as a calculation parameter for the correction term, the correction means may calculate as the correction term a value that more greatly reduces the air amount calculated by the calculation means, if the engine rotation speed is lower.

Even where the rate of change in the intake air pressure (i.e., the amount of change thereof per unit time) remains the same, the lower the engine rotation speed, the larger the amount of change in the intake air pressure per intake stroke, and therefore the larger the air amount that is a part of the increase in the passage air amount which is consumed by the rise in the intake air pressure, and that is consumed per intake stroke. Therefore, the lower the engine rotation speed, the larger the difference between the reference passageway air amount and the reference in-cylinder air amount per intake stroke becomes. According to the foregoing construction, it becomes possible to subject the reference passageway air amount to the reducing correction in accordance with the tendency of occurrence of the aforementioned difference and provide the thus corrected value as a value that corresponds to the reference in-cylinder air amount.

Besides, the setting means may set as the upper-limit injection amount an amount that is larger if the air amount obtained through the reducing correction by the correction means is larger, and that is larger if the fuel injection amount in the fuel injection for torque generation is smaller.

Further, the post-injection may be a fuel injection executed so as to supply an unburned fuel component to the exhaust purification device, and the exhaust purification device may include an oxidation catalyst.

According to this construction, it is possible to prevent the occurrence of an event that a part of unburned fuel components by which the unburned fuel components in exhaust gas exceeds the processing capability of the oxidation catalyst remains unreacted and is emitted out of the exhaust passageway. Therefore, it is possible to restrain deterioration of the property of emissions.

Further, the exhaust purification device may further include an exhaust filter that is disposed downstream of the oxidation catalyst in an exhaust gas flow direction and that traps a particulate matter in exhaust gas.

In the device in which an exhaust filter is disposed downstream of the oxidation catalyst in the exhaust gas flow direction, the function recovery of the exhaust filter is performed as follows. That is, firstly the oxidation of unburned fuel components on the oxidation catalyst raises the temperature of the exhaust gas, and then the inflow of the high-temperature exhaust gas heats the exhaust filter to high temperature so that the particulate matter trapped on the exhaust filter is removed by oxidation.

According to the foregoing construction, it is possible to substantially prevent the occurrence of an event that a part of the unburned fuel components in exhaust gas passes unreacted through the exhaust gas purification device and is emitted out of the exhaust passageway.

A second aspect of the invention relates to a control method for a fuel injection device which is applied to an internal combustion engine having a fuel injection valve that injects fuel directly into a combustion chamber, a supercharger that forces air into the combustion chamber, and an exhaust purification device provided on an exhaust passageway, and which executes, as a fuel injection from the fuel injection valve, a post-injection that is a fuel injection during an expansion stroke or an exhaust stroke, separately from the fuel injection for torque generation.

The control method includes:
detecting a rotation speed of an engine output shaft;
detecting an air amount that flows in the intake passageway upstream of the supercharger in an air flow direction;
detecting an air pressure inside the intake passageway downstream of the supercharger in the air flow direction;
calculating a correction term based on a rate of change of the air pressure detected;
setting an upper-limit injection amount based on the rotation speed of the engine output shaft, the air amount, the correction term, and a fuel injection amount in the fuel injection for torque generation; and
restricting the fuel injection amount in the post-injection with the upper-limit injection amount.

According to the second aspect of the invention, as in the first aspect of the invention, it is possible to accurately set the upper-limit injection amount at the time of post-injection which allows the exhaust gas air-fuel ratio to be kept at a ratio above a predetermined ratio in a manner that accords with the in-cylinder air amount and the fuel injection amount injected by the fuel injection for torque generation, and it is possible to restrain the deterioration of the property of emissions caused by the execution of the post-injection.

BRIEF DESCRIPTION OF THE DRAWINGS

The foregoing and further features and advantages of the invention will become apparent from the following descrip

FIGS. 5A-5H are timing charts showing examples of transitions of various engine parameters when the restriction process is executed.

DETAILED DESCRIPTION OF EMBODIMENTS

Figure 1:
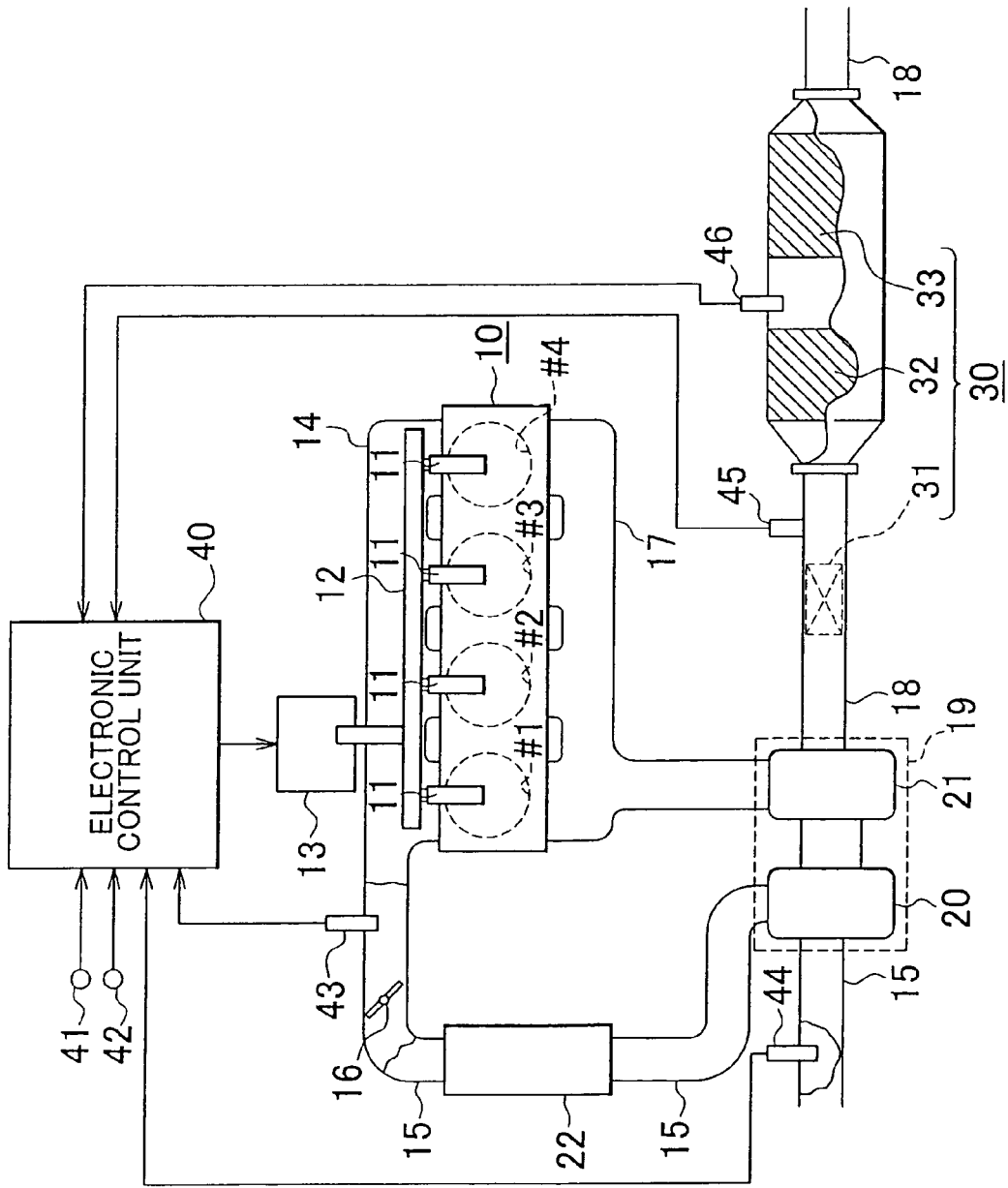
- FIG. 1 is a schematic diagram showing an overall construction of an internal combustion engine and its peripheral appliances to which an embodiment of the invention is applied.

An embodiment in which the fuel injection device of the invention is embodied will be described. FIG. 1 is a schematic construction diagram showing an internal combustion engine and its peripheral appliances to which a fuel injection device in accordance with this embodiment is applied.

As shown in FIG. 1, the fuel injection device in accordance with this embodiment is mounted in an internal combustion engine 10 that has a plurality of cylinders #1 to #4. A plurality of fuel injection valves 11 are attached to the internal combustion engine 10. These fuel injection valves 11 are provided so as to inject fuel directly into the combustion chambers of the cylinders #1 to #4. The fuel injection valves 11 are connected to a common rail 12 provided as a pressure accumulation pipe, and the common rail 12 is connected to a supply pump 13. The supply pump 13 sucks fuel stored in a fuel tank (not shown), and pumps it toward the common rail 12. Therefore, the inside of the common rail 12 is filled with high-pressure fuel. In the fuel injection device in accordance with this embodiment, high-pressure fuel in the common rail 12 is injected directly into the combustion chamber of each cylinder #1 to #4 through an opening-closing control of the fuel injection valves 11.

The cylinders #1 to #4 of the internal combustion engine 10 are connected to an intake passageway 15 via an intake manifold 14. In the internal combustion engine 10, air from outside (external air) is taken into the combustion chambers of the cylinders #1 to #4 via the intake manifold 14 and the intake passageway 15. The intake passageway 15 is provided with a throttle valve 16 that changes the passageway cross-sectional area of the intake passageway 15. Through a control of the degree of opening of the throttle valve 16, the amount of air passing through the intake passageway 15 (intake air amount) is adjusted.

On the other hand, the cylinders #1 to #4 of the internal combustion engine 10 are connected to an exhaust passageway 18 via an exhaust manifold 17. In the internal combustion engine 10, gas after combustion in the combustion chamber of each cylinder #1 to #4 (exhaust gas) is discharged to the outside via the exhaust manifold 17 and the exhaust passageway 18.

The internal combustion engine 10 is provided with an exhaust gas-driven supercharger 19. This supercharger 19 is constructed of a compressor 20 provided on the intake passageway 15 on an upstream side of the throttle valve 16, that is, an upstream side thereof in the flowing direction of the intake air, and a turbine 21 provided on the exhaust passageway 18.

This supercharger 19 does not operate when the load of the internal combustion engine 10 is small and the amount of exhaust gas is small (the amount of work≈"0"), and operates when the load of the internal combustion engine 10 is large and the amount of exhaust gas is large (the amount of work>>"0"). During operation of the supercharger 19, a large amount of exhaust gas passing through the turbine 21 causes the compressor 20 to operate, so that the air flowing in the intake passageway 15 is pressure-fed into, that is, forced into, the combustion chambers of the internal combustion engine 10.

Incidentally, an intercooler 22 is provided on the intake passageway 15 between the throttle valve 16 and the compressor 20. The intercooler 22 cools the air whose temperature has become high due to the supercharging performed by the supercharger 19.

Furthermore, an exhaust purification device 30 is provided on the exhaust passageway 18 on a downstream side of the turbine 21, that is, a downstream side thereof in the flowing direction of the exhaust gas. The exhaust purification device 30 purifies exhaust gas by trapping or converting atmosphere-polluting substances in the exhaust gas, such as fine particulate matter (PM), carbon monoxide (CO), hydrocarbon (HC), etc.

Specifically, the exhaust purification device 30 includes two catalyst converters 31, 32, and one filter 33. The two catalyst converters 31, 32 each contain an oxidation catalyst supported therein, and are disposed so as to align in series with an interval therebetween in the exhaust gas flow direction. These catalyst converters 31, 32 convert CO and HC in exhaust gas into dioxide ($CO_2$) and water ($H_2O$), which are basically harmless. The filter 33 is disposed on the downstream side of the catalyst converters 31, 32 in the exhaust gas flow direction. The filter 33 traps PM in exhaust gas.

The internal combustion engine 10 is equipped with various sensors as its peripheral appliances. The various sensors include, for example, an accelerator operation sensor 41 for detecting the amount of operation of an accelerator pedal (not shown) (the accelerator depression amount AC), and a speed sensor 42 for detecting the rotation speed of an engine output shaft (not shown) (the engine rotation speed NE). Furthermore, a pressure sensor 43 is provided on the intake passageway 15 on the downstream side of the throttle valve 16 in the intake air flowing direction so as to detect the air pressure in the intake passageway 15 (the intake air pressure P). Also, an air amount sensor 44 is provided on the intake passageway 15 on the upstream side of the compressor 20 in the intake air flowing direction so as to detect the amount of air flowing in the intake passageway 15 (the passageway air amount GAp). The internal combustion engine 10 is also provided with a temperature sensor 45 for detecting the temperature Ta of the exhaust gas passing through a portion of the exhaust passageway 18 between the two catalyst converters 31, 32, a temperature sensor 46 for detecting the temperature Tb of the exhaust gas that has passed through the two catalyst converters 31, 32, etc.

The internal combustion engine 10 is also equipped with an electronic control device 40 as a peripheral appliance. The electronic control device 40 constructed of, for example, a microcomputer. The electronic control device 40 takes in output signals of the foregoing various sensors, and performs various computations, and, on the basis of results of the computations, executes various controls concerning the operation of the internal combustion engine 10, such as the drive control of the fuel injection valve 11, the opening degree control of the throttle valve 16, etc.

In the drive control of the fuel injection valve 11, the amount of fuel injected by the fuel injection for torque generation (main injection). Concretely, a control target value regarding the fuel injection amount in the main injection (the main injection amount Qm) is set on the basis of the accelerator depression amount AC and the engine rotation speed NE. The main injection amount Qm calculated is the larger, the greater the accelerator depression amount AC is, and the higher the engine rotation speed NE is. Then, the fuel injection valve 11 is driven to open for a duration that corresponds to the thus obtained main injection amount Qm, so that an amount of fuel appropriate to the state of operation of the internal combustion engine 10 is supplied by injection.

Furthermore, in the drive control of the fuel injection valve 11, besides the main injection, a fuel injection (post-injection) is executed during a later period in the expansion stroke of the internal combustion engine 10 (e.g., 120° CA to 160° CA after the compression top dead center (ATDC)). This post-injection is executed in order to recover the function of the filter 33. Specifically, the execution of the post-injection adds unburned fuel components into exhaust gas, and the unburned fuel components are oxidized in the two catalyst converters 31, 32, so that the exhaust gas temperature rises. Then, the high-temperature exhaust gas passes through the filter 33, so that the temperature of the filter 33 becomes high, and the PM trapped on the filter 33 becomes oxidized.

The post-injection is executed on condition that an execution condition is satisfied. It is determined that this execution condition is satisfied, provided that the condition (a) and the condition (b) below are both fulfilled. (a) The amount of PM trapped on the filter 33 (PM deposit amount) be greater than or equal to a predetermined amount. In this embodiment, the PM deposit amount on various occasions are estimated on the basis of the state of operation of the internal combustion engine 10, the temperature of the filter 33, etc., and are pre-stored in the electronic control device 40. (b) The temperature of the catalyst converter 32 on the downstream side in the exhaust gas flow direction be a greater than or equal to predetermined temperature. Incidentally, in this embodiment, the temperatures of the catalyst converter 32 on various occasions are estimated on the basis of the exhaust gas temperature Ta, and are pre-stored in the electronic control device 40.

The control target value of the amount of fuel injected in the post-injection (the target post-injection amount Qp) is set on the basis of the main injection amount Qm and the engine rotation speed NE. The smaller the main injection amount Qm, the lower the temperature of the gas discharged from the combustion chamber into the exhaust passageway 18, and therefore the more fuel is needed in order to maintain a predetermined temperature of the filter 33. Besides, the lower the engine rotation speed NE, the smaller the amount of exhaust gas passing through the filter 33 is, in other words, the smaller the quantity of heat transferred from exhaust gas to the filter 33 is, and therefore the more fuel is needed in order to maintain a predetermined temperature of the filter 33.

Taking these actual circumstances into consideration, an amount of injection of fuel that allows the temperature of the filter 33 to be kept at a predetermined target temperature (e.g., 600 to 700° C.) is set as a target post-injection amount Qp. Specifically, a relationship between the engine operation region determined from the main injection amount Qm and the engine rotation speed NE and the target post-injection amount Qp suitable to the engine operation region is found on the basis of results of experiments and the like. The thus found relationship is stored as a computation map in the electronic control device 40, and the target post-injection amount Qp is set with reference to this computation map.

Furthermore, the control target value of the fuel injection timing of the post-injection (the target post-injection timing Tp) is set on the basis of the main injection amount Qm and the engine rotation speed NE. As for this target post-injection timing Tp, a timing that can restrain both the combustion of the injected fuel and the deposit thereof on the combustion chamber wall surface is set. Specifically, a relationship between the engine operation region determined from the main injection amount Qm and the engine rotation speed NE and the target post-injection timing Tp suitable to the engine operation region is found on the basis of results of experiments. The thus found relationship is stored as a computation map in the electronic control device 40. With reference to the computation map, the target post-injection timing Tp is set.

Then, in the opening-closing control of the fuel injection valve 11 in accordance with this embodiment, the post-injection is executed by opening the fuel injection valve 11 at the target post-injection timing Tp for a duration that corresponds to the target post-injection amount Qp. In this embodiment, the temperature at the downstream end of the downstream-side catalyst converter 32 in the exhaust gas flow direction, that is, the temperature of the upstream end of the filter 33 (the filter temperature Tf), is estimated on the exhaust gas temperature Tb, and is pre-stored in the electronic control device 40. When the post-injection is executed, the target post-injection amount Qp is feedback-controlled so that the filter temperature Tf becomes equal to a predetermined target temperature (e.g., 600 to 700° C.).

In this embodiment, when the post-injection is executed, an upper-limit injection amount Qgd of the target post-injection amount Qp is calculated, and the target post-injection amount Qp is restricted by the upper-limit injection amount Qgd. This restrains the exhaust gas air-fuel ratio from becoming an excessively fuel-rich air-fuel ratio at the time of sharp acceleration of the internal combustion engine 10, and therefore substantially prevents the occurrence of an event that a part of unburned fuel components by which the unburned fuel components in exhaust gas exceeds the processing capability of the catalyst converters 31, 32 remains unreacted and is emitted out of the exhaust passageway 18. In this manner, deterioration of the property of emissions is reduced or substantially prevented.

Figure 2:
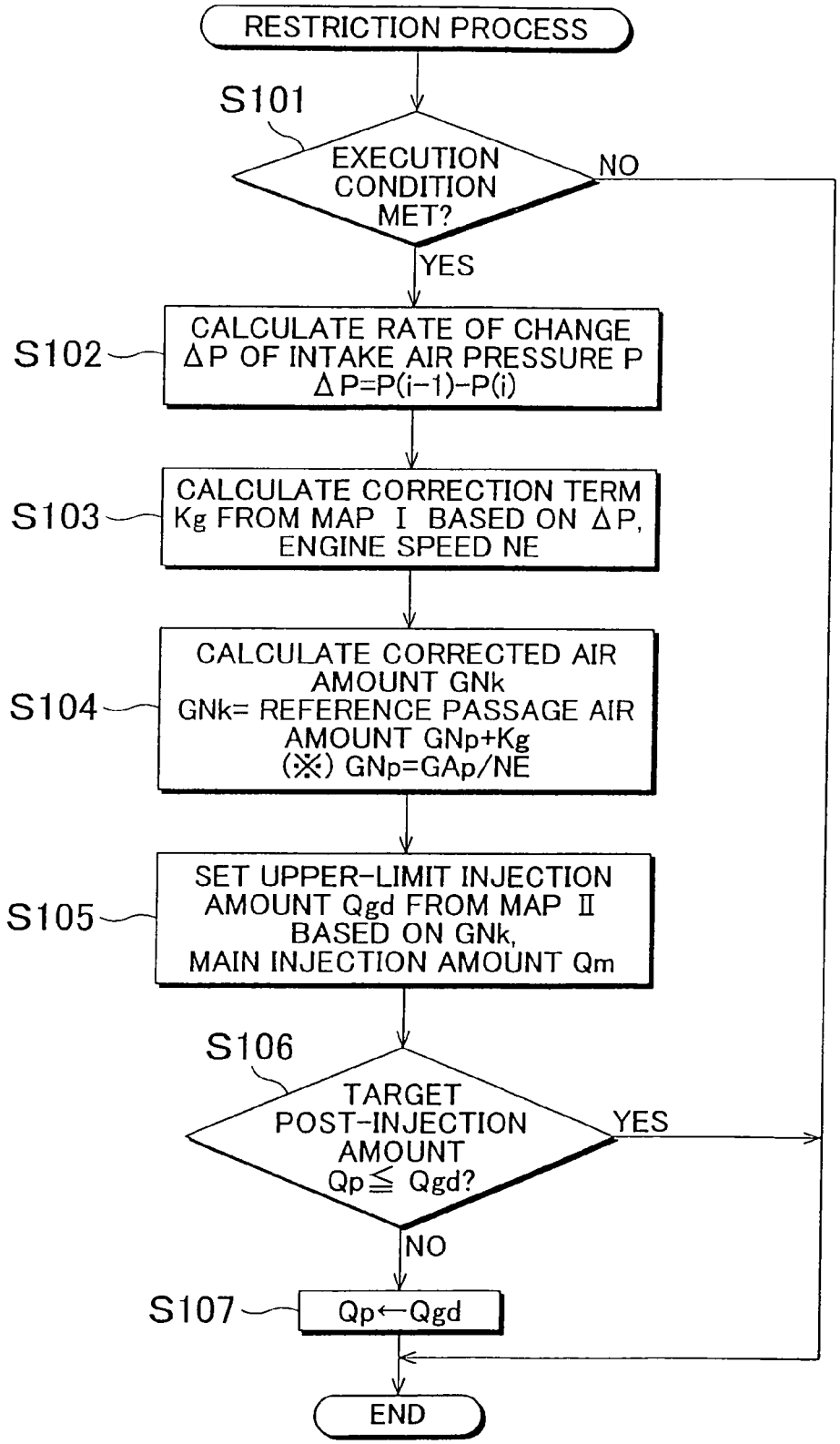
FIG. 2 is a flowchart showing a concrete processing procedure of a restriction process.

A procedure of executing the process of restricting the target post-injection amount Qp with the upper-limit injection amount Qgd (restriction process) will be described hereinafter with reference to FIG. 2. FIG. 2 is a flowchart showing a concrete processing procedure of the restriction process. The series of processes shown in this flowchart is executed by the electronic control device 40 as a periodic process at every predetermined time (e.g., several milliseconds).

As shown in FIG. 2, in this process, on condition that the aforementioned execution condition is satisfied (YES in step S101), the following process is executed (steps S102 to S107). If the execution condition is satisfied, the electronic control device 40 firstly calculates the rate of change $\Delta P$ of the intake air pressure P (step S102). As for the rate of change $\Delta P$, a difference between the intake air pressure $P(i-1)$ detected in the previous execution cycle of this process and the intake air pressure $P(i)$ detected in the present execution cycle (the difference=$P(i-1)-P(i)$) is calculated.

After that, a correction term Kg is calculated from a map I on the basis of the rate of change $\Delta P$ and the engine rotation speed NE (step S103). In this embodiment, the value calculated as the correction term Kg is a value that corresponds to the amount of air consumed to raise the intake air pressure P that is a part of the passageway air amount per rotation of the engine output shaft (the reference passageway air amount GNp (=GAp/NE)).

Figure 3:
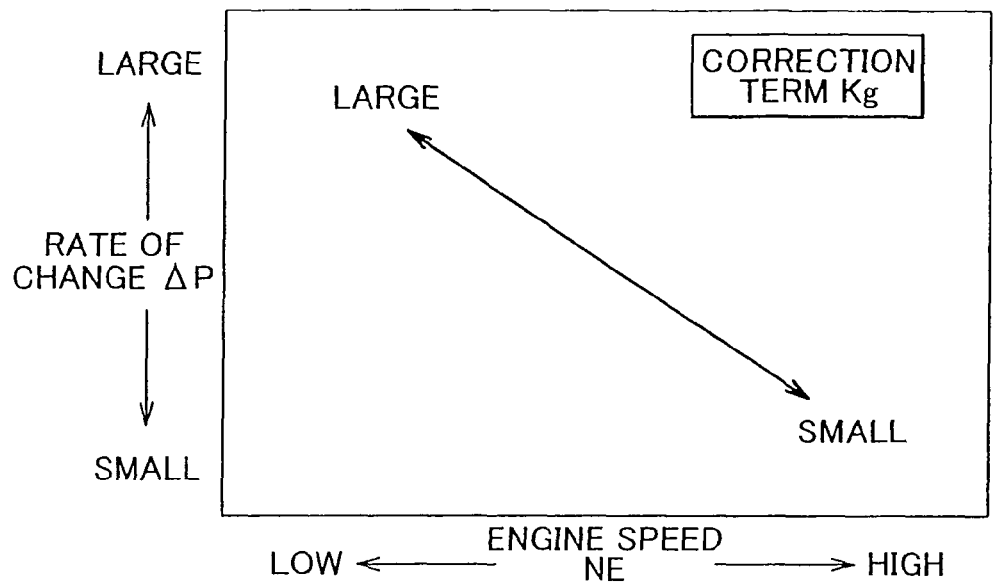
FIG. 3 is a schematic diagram showing a map structure of a map I for use for calculating a correction term.

FIG. 3 shows a map structure of the map I. As shown in FIG. 3, the map I stores a relationship between the engine operation region determined from the rate of change ΔP and the engine rotation speed NE and the correction term Kg suitable for that engine operation region which relationship has been found on the basis of results of experiments and the like.

It is to be noted herein that the higher the rate of change ΔP of the intake air pressure P, the more rapid changes the passageway air amount GAp and the air amount actually taken into the combustion chamber (the in-cylinder air amount GAs) undergo, and the larger the deviation between the passageway air amount GAp and the in-cylinder air amount GAs. Besides, even where the rate of change ΔP of the intake air pressure P (i.e., the amount of change in the intake air pressure P per unit time) remains the same, the lower the engine rotation speed NE, the larger the amount of change in the intake air pressure P per intake stroke, and therefore the larger the air amount that is a part of the amount of increase in the passageway air amount GAp which is consumed by the rise in the intake air pressure P, and that is consumed per intake stroke. Therefore, the lower the engine rotation speed NE, the larger the deviation between the in-cylinder air amount GAs and the passageway air amount GAp per intake stroke. Taking these actual circumstances into consideration, the correction term Kg is calculated in this embodiment so that the higher the rate of change ΔP or the lower the engine rotation speed NE, the smaller on the negative side the correction term Kg. Incidentally, in this embodiment, step S103 functions as correction term calculation means.

After the correction term Kg calculated in this manner, the aforementioned reference passageway air amount GNp is found, and the correction term Kg is added to the reference passageway air amount GNp to calculate a corrected air amount GNk (step S104 in FIG. 2). Thus, the reference passageway air amount GNp is subjected to a reducing correction in accordance with the tendency of the difference between the passageway air amount GAp and the in-cylinder air amount GAs, that is, in a manner in which the larger the deviation between the passageway air amount GAp and the in-cylinder air amount GAs, the larger reducing correction the reference passageway air amount GNp is subjected to. This correcting calculation provides the value (the aforementioned corrected air amount GNk) that corresponds to the in-cylinder air amount per rotation of the engine output shaft (the reference in-cylinder air amount GNs). In this embodiment, the process of step S104 functions as air amount calculation means and correction means.

Figure 4:
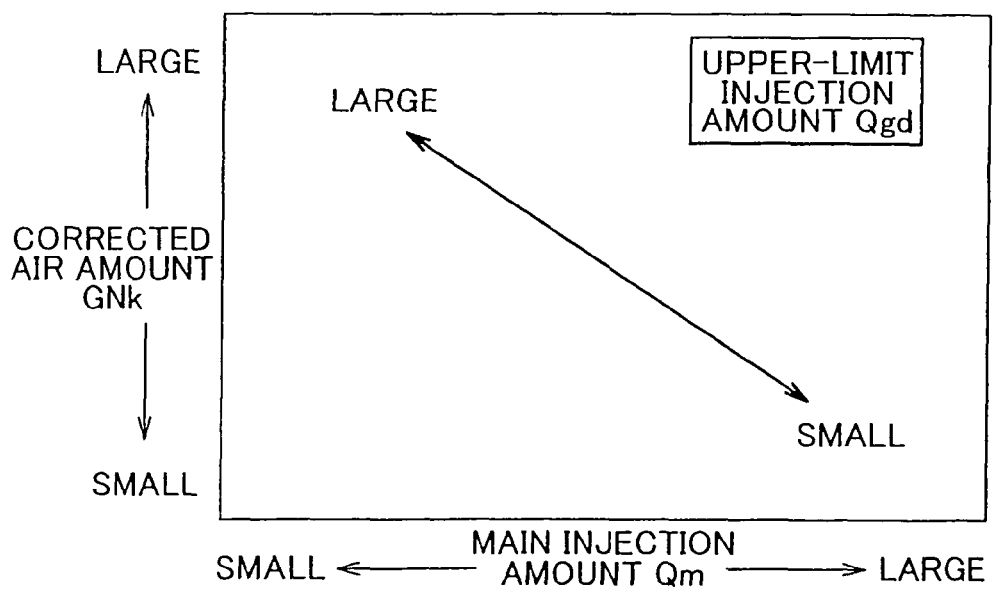
FIG. 4 is a schematic diagram showing a map structure of a map II for use for setting an upper-limit injection amount.

After that, an upper-limit injection amount Qgd is set from a map II on the basis of the corrected air amount GNk and the main injection amount Qm (step S105). FIG. 4 shows a map structure of the map II. As shown in FIG. 4, the map II stores a relationship between the engine operation region determined from the corrected air amount GNk and the main injection amount Qm and the upper-limit injection amount Qgd suitable for that engine operation region which relationship has been found on the basis of results of experiments and the like.

Since the in-cylinder air amount GAs can be specifically determined by the corrected air amount GNk, a value that corresponds to the fuel injection amount that brings about a predetermined air-fuel ratio of exhaust gas is set (e.g., 15.5), taking the in-cylinder air amount GAs into account. Concretely, the larger the corrected air amount GNk or the smaller the main injection amount Qm, the larger amount is set as the upper-limit injection amount Qgd. In this embodiment, the process of step S105 functions as setting means.

After the upper-limit injection amount Qgd is set in this manner, the target post-injection amount Qp is restricted with the upper-limit injection amount Qgd. Concretely, if the target post-injection amount Qp is larger than the upper-limit injection amount Qgd (NO in step S106 in FIG. 2), the upper-limit injection amount Qgd is set as a target post-injection amount Qp (step S107). On the other hand, if the target post-injection amount Qp is less than or equal to the upper-limit injection amount Qgd (YES in step S106), the target post-injection amount Qp is not subjected to correction. In this embodiment, the process of step S106 and S107 functions as restriction means.

After this process, the process of this flowchart temporarily ends. The operation and effect of the execution of the foregoing restriction process will be described. FIGS. 5A-5H show examples of transitions of various engine parameters involved when the accelerator pedal is depressed from the undepressed state to the fully operated position.

As shown in FIGS. 5A-5H, if the accelerator pedal is depressed at time t1 (FIG. 5A), the main injection amount Qm (FIG. 5B) is increased, so that the engine rotation speed NE (FIG. 5C) rises. In association with this, the amount of exhaust gas increases, and the supercharger 19 comes to operate.

At this time, if the execution condition for the post-injection is satisfied, the target post-injection amount Qp is calculated and the upper-limit injection amount Qgd is set, so that the post-injection is executed, with the target post-injection amount Qp restricted by the upper-limit injection amount Qgd. Therefore, the exhaust gas air-fuel ratio (FIG. 5D) becoming an excessively rich air-fuel ratio is substantially prevented.

It is to be noted herein that the upper-limit injection amount Qgd that allows the exhaust gas air-fuel ratio to be kept at a ratio above a predetermined ratio can basically be found on the basis of the reference passageway air amount GNp and the main injection amount Qm.

However, when the internal combustion engine 10 sharply accelerates, both the reference passageway air amount GNp (FIG. 5E) and the reference in-cylinder air amount GNs increase, but a part of the increase in the reference passageway air amount GNp is consumed by the rise in the intake air pressure P (FIG. 5F). Therefore, the amount that is larger than the reference in-cylinder air amount GNs by the amount of air consumed by the rise in the intake air pressure P is detected as the reference passageway air amount GNp.

Therefore, if the upper-limit injection amount is to be set on the basis of the reference passageway air amount GNp, a value appropriate to the amount of air that is larger than the reference in-cylinder air amount GNs will be set as the upper-limit injection amount, so that it will be impossible to properly avoid the exhaust gas air-fuel ratio becoming excessively rich (see a one-dot chain line in FIG. 5D).

In this embodiment, however, a value that corresponds to the amount of air consumed to raise the intake air pressure P (correction term Kg (FIG. 5G)) is calculated, and is used to perform the reducing correction of the reference passageway air amount GNp, whereby a value (corrected air amount GNk (FIG. 5H)) that corresponds to the reference in-cylinder air amount GNs is calculated. Then, on the basis of the corrected air amount GNk, the upper-limit injection amount Qgd regarding the post-injection which allows the exhaust gas air-fuel ratio to be kept at a ratio above a predetermined ratio is set.

Therefore, even in the case where, at the time of sharp acceleration of the internal combustion engine 10, an amount of air larger than the amount appropriate to the in-cylinder air amount GAs is detected as the passageway air amount GAp, an upper-limit injection amount Qgd appropriate to the in-cylinder air amount GAs is set, and the upper-limit injection amount Qgd restricts the amount of fuel injection provided by the post-injection. Therefore, the exhaust gas air-fuel ratio becoming excessively rich is properly restrained, and the deterioration of the property of emissions caused by the execution of the post-injection is restrained.

As described above, according to this embodiment, the following advantages can be obtained. (1) It becomes possible to restrain the deterioration of the property of emissions caused by execution of the post-injection.

(2) As the correction term Kg, a value is calculated which, in the calculation of the corrected air amount GNk, makes the larger reduction from the reference passageway air amount GNp the higher the rate of change $\Delta P$ in the intake air pressure P. Therefore, the reference passageway air amount GNp can be subjected to the reducing correction in accordance with the tendency of occurrence of the difference between the reference passageway air amount GNp and the reference in-cylinder air amount GNs. The thus calculated air amount is provided as a corrected air amount GNk.

This embodiment may also be modified as follows.
The manner of calculating the rate of change $\Delta P$ in the intake air pressure P may be arbitrarily modified as long as the rate of change $\Delta P$ in the intake air pressure P per unit time can be calculated. For example, the difference between the intake air pressure P(i-2) detected during the execution cycle of the restriction process before the previous cycle and the intake air pressure P(i) detected during the present execution cycle of the restriction process (the difference=P(i-2)-P(i)) may be calculated as the rate of change $\Delta P$.

The use of the engine rotation speed NE as a calculation parameter for the correction term Kg may be omitted.
The upper-limit injection amount may be set through (PROCEDURE 1) to (PROCEDURE 3) as follows. (PROCEDURE 1) The correction term Kgi is calculated on the basis of the engine rotation speed NE and the rate of change $\Delta P$ of the intake air pressure P. As the correction term Kgi, a value that corresponds to the amount of air consumed to raise the intake air pressure P that is a part of the passageway air amount GAp is calculated. Concretely, the higher the rate of change $\Delta P$ or the lower the engine rotation speed NE, the smaller negative value is calculated as the correction term Kgi. (PROCEDURE 2) The corrected air amount GApk (=GAp+Kgi) is calculated by subjecting the passageway air amount GAp to the reducing correction with the correction term Kgi. The passageway air amount GAp is subjected to the reducing correction in accordance with the tendency of occurrence of the difference between the degree of increase in the passageway air amount GAp and the degree of increase in the in-cylinder air amount GAs, for example, in a manner in which the larger the difference therebetween, the larger reducing correction the passageway air amount GAp is subjected to. The thus calculated passageway air amount is provided as a value (corrected air amount GApk mentioned above) appropriate to the in-cylinder air amount GAs. (PROCEDURE 3) The upper-limit injection amount Qgdi is set on the basis of the corrected air amount GApk, the main injection amount Qm and the engine rotation speed NE. Since the in-cylinder air amount GAs can be specifically determined by the corrected air amount GApk and the engine rotation speed NE, a value that corresponds to the fuel injection amount that causes the exhaust gas air-fuel ratio to be equal to the predetermined ratio is set as an upper-limit injection amount Qgdi, taking the in-cylinder air amount GAs into consideration. Concretely, the upper-limit injection amount Qgdi is set so that the upper-limit injection amount Qgdi is the larger, the larger the corrected air amount GApk that has been corrected with the correction term Kgi, or the smaller the main injection amount Qm, or the lower the engine rotation speed NE.

The invention is not limited to the fuel injection device that executes, as the post-injection, fuel injection during a later period of the exhaust stroke of the internal combustion engine, but is also applicable to a fuel injection device that executes, as the post-injection, fuel injection during the exhaust stroke of the internal combustion engine.

The fuel injection device in accordance with the invention is also applicable to an internal combustion engine not equipped with an intercooler, an internal combustion engine equipped with only one catalyst converter, and an internal combustion engine not equipped with a catalyst converter.

The invention is applicable not only to the internal combustion engines equipped with exhaust gas-driven superchargers, but also to an internal combustion engine equipped with a type of supercharger driven by an engine output shaft, that is, a so-called mechanical supercharger.

The fuel injection device in accordance with the invention is applicable to internal combustion engines having one to three cylinders, and also to internal combustion engines having five or more cylinders.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

The invention claimed is:

1. A control method for a fuel injection device which is applied to an internal combustion engine having a fuel injection valve that injects fuel directly into a combustion chamber, a supercharger that forces air into the combustion chamber, and an exhaust purification device provided on an exhaust passageway, and which executes, as a fuel injection from the fuel injection valve, a post-injection that is a fuel injection during an expansion stroke or an exhaust stroke, separately from the fuel injection for torque generation, the control method comprising:
detecting a rotation speed of an engine output shaft;
detecting an air amount that flows in the intake passageway upstream of the supercharger in an air flow direction;
detecting an air pressure inside the intake passageway downstream of the supercharger in the air flow direction;
calculating a correction term based on a rate of change of the air pressure detected;
setting an upper-limit injection amount based on the rotation speed of the engine output shaft, the air amount, the correction term, and a fuel injection amount in the fuel injection for torque generation; and
restricting the fuel injection amount in the post-injection with the upper-limit injection amount.

2. A fuel injection device which is applied to an internal combustion engine having a fuel injection valve that injects fuel directly into a combustion chamber, a supercharger that forces air into the combustion chamber, and an exhaust purification device provided on an exhaust passageway, and which executes, as a fuel injection from the fuel injection valve, a post-injection that is a fuel injection during an expansion stroke or an exhaust stroke, separately from the fuel injection for torque generation, the fuel injection device comprising:
a rotation speed sensor for detecting a rotation speed of an engine output shaft;
an air amount sensor that is provided on an intake passageway upstream of the supercharger in an air flow direction, and that detects an air amount that flows in the intake passageway;
a pressure sensor that is provided on the intake passageway downstream of the supercharger in the air flow direction, and that detects an air pressure inside the intake passageway;
correction term calculation portion that calculates a correction term based on a rate of change of the air pressure detected by the pressure sensor;
setting portion that sets an upper-limit injection amount based on the rotation speed of the engine output shaft, the air amount, the correction term, and a fuel injection amount in the fuel injection for torque generation; and
restriction portion that restricts the fuel injection amount in the post-injection with the upper-limit injection amount.

3. The fuel injection device according to claim 2, wherein the post-injection is a fuel injection executed so as to supply an unburned fuel component to the exhaust purification device, and the exhaust purification device includes an oxidation catalyst.

4. The fuel injection device according to claim 3, wherein the exhaust purification device further includes an exhaust filter that is disposed downstream of the oxidation catalyst in an exhaust gas flow direction and that traps a particulate matter in exhaust gas.

5. The fuel injection device according to claim 2 further comprising:
air amount calculation portion that calculates the air amount that flows in the intake passageway per unit rotation of the engine output shaft based on the air amount and the rotation speed of the engine output shaft; and
correction portion that subjects the air amount calculated by the air amount calculation portion to a reducing correction with the correction term,
wherein the setting portion sets the upper-limit injection amount based on the air amount corrected by the correction means and the fuel injection amount in the fuel injection for torque generation.

6. The fuel injection device according to claim 5, wherein the setting portion sets as the upper-limit injection amount an amount that is larger if the air amount obtained through the reducing correction by the correction portion is larger, and that is larger if the fuel injection amount in the fuel injection for torque generation is smaller.

7. The fuel injection device according to claim 5, wherein the correction portion calculates as the correction term a value that more greatly reduces the air amount calculated by the calculation portion, if the rate of change of the air pressure detected by the pressure sensor is higher.

8. The fuel injection device according to claim 7, wherein using an engine rotation speed as a calculation parameter for the correction term, the correction portion calculates as the correction term a value that more greatly reduces the air amount calculated by the calculation portion, if the engine rotation speed is lower.

* * * * *